(12) United States Patent
Shapiro

(10) Patent No.: US 8,997,993 B2
(45) Date of Patent: Apr. 7, 2015

(54) STACKABLE ENVELOPE TRAYS

(75) Inventor: Norman L. Shapiro, Maumee, OH (US)

(73) Assignee: E.M.I. Enterprises, Inc., Toledo, OH (US)

( * ) Notice: Subject to any disclaimer, the term of this patent is extended or adjusted under 35 U.S.C. 154(b) by 415 days.

(21) Appl. No.: 13/435,791

(22) Filed: Mar. 30, 2012

(65) Prior Publication Data

US 2013/0026057 A1 Jan. 31, 2013

Related U.S. Application Data

(60) Provisional application No. 61/512,009, filed on Jul. 27, 2011.

(51) Int. Cl.
  *B65D 21/032* (2006.01)
  *B65D 21/02* (2006.01)
  *B65G 47/90* (2006.01)

(52) U.S. Cl.
  CPC .......... *B65D 21/0212* (2013.01); *B65G 47/904* (2013.01); *B65D 2203/02* (2013.01); *B65D 2203/10* (2013.01)

(58) Field of Classification Search
  CPC .................................................. B65D 21/0212
  USPC .............. 206/459.5, 503, 509, 511, 512, 557; D19/92; 211/126.1, 126.2, 128.1, 189, 211/194; 220/677, 4.26, 4.27
  See application file for complete search history.

(56) References Cited

U.S. PATENT DOCUMENTS

| | | | |
|---|---|---|---|
| 3,750,892 A | 8/1973 | Grosse | |
| 4,120,444 A * | 10/1978 | Gray | 206/511 |
| 4,333,573 A | 6/1982 | Holoubek | |
| 4,366,905 A * | 1/1983 | Forshee | 206/511 |
| 4,671,411 A * | 6/1987 | Rehrig et al. | 206/511 |
| 5,186,338 A * | 2/1993 | Boutet | 206/509 |
| D334,412 S | 3/1993 | Feer | |
| 5,279,438 A * | 1/1994 | Cesano | 220/7 |
| 5,460,292 A * | 10/1995 | Holman | 206/512 |
| 5,531,352 A * | 7/1996 | Kraft et al. | 206/512 |
| 5,638,973 A * | 6/1997 | Dewey et al. | 206/509 |
| 6,749,077 B1 * | 6/2004 | McAlpine et al. | 220/4.29 |
| 7,607,542 B1 * | 10/2009 | Hsieh | 206/600 |
| 7,637,373 B2 | 12/2009 | Stahl | |
| 7,699,172 B2 | 4/2010 | McTavish et al. | |
| 2005/0236348 A1 | 10/2005 | Killinger et al. | |
| 2012/0223083 A1 * | 9/2012 | Hug | 220/507 |

FOREIGN PATENT DOCUMENTS

WO WO 2011/058489 * 5/2011

* cited by examiner

*Primary Examiner* — Luan K Bui
(74) *Attorney, Agent, or Firm* — MacMillan, Sobanski & Todd, LLC

(57) ABSTRACT

A stackable tray is provided that includes a tray having a bottom, a pair of side walls each having an upper edge, and a rear wall. A pair of support columns is provided on each side wall. Each of the support columns includes: a protrusion extending upwardly from a top portion of the support column; a first groove formed in a bottom portion of the support column, the first groove being aligned with the protrusion in the vertical direction; and a second groove formed in the bottom portion of the support column, the second groove being aligned with the upper edge of the respective side wall in the vertical direction.

11 Claims, 7 Drawing Sheets

STACKABLE ENVELOPE TRAYS

CROSS-REFERENCE TO RELATED APPLICATIONS

This application claims the benefit of U.S. Provisional Application No. 61/512,009 filed Jul. 27, 2011, the disclosure of which is incorporated herein by reference.

BACKGROUND OF THE INVENTION

This invention relates in general to stackable trays, such as can be used to store and transport various types of manufactured envelope products. In particular, this invention relates to stackable trays that can be stacked and retrieved with relative ease.

Corrugated boxes are typically used in the envelope processing and printing industries for storing and transporting large quantities of envelopes and other types of stationary products. However, there are a number of drawbacks with the use of corrugated boxes in these industries. For example, when a plurality of corrugated boxes are filled with envelopes and then stacked on top of one another, the boxes near the bottom of the stack have a tendency to buckle under the weight of the boxes stacked above. In addition, differently sized corrugated boxes are used for differently sized envelopes. As such, it can be somewhat difficult to stack the various sized boxes in an efficient manner. Corrugated boxes also have a limited usable life and, therefore, are usually discarded and replaced on a regular basis, which can have a negative impact on the environment. It has also been found that corrugated boxes are not generally compatible for use with automated stacking and retrieval systems. Thus, it would be desirable to provide stackable and reusable trays that are durable, suitable for envelopes of varying sizes, environmentally friendly, and compatible for use with an automated stacking and retrieval system. It would also be desirable to provide trays that enable the storing, stacking, and transporting of envelopes without any weight or pressure being applied to the actual envelopes on lower layers of a skid or other supporting and transporting device.

SUMMARY OF THE INVENTION

This invention relates to a stackable tray that can be stacked and retrieved with relative ease. The stackable tray includes a tray having a bottom, a pair of side walls each having an upper edge, and a rear wall. A pair of support columns is provided on each side wall. Each of the support columns includes: a protrusion extending upwardly from a top portion of the support column; a first groove formed in a bottom portion of the support column, the first groove being aligned with the protrusion in the vertical direction; and a second groove formed in the bottom portion of the support column, the second groove being aligned with the upper edge of the respective side wall in the vertical direction.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
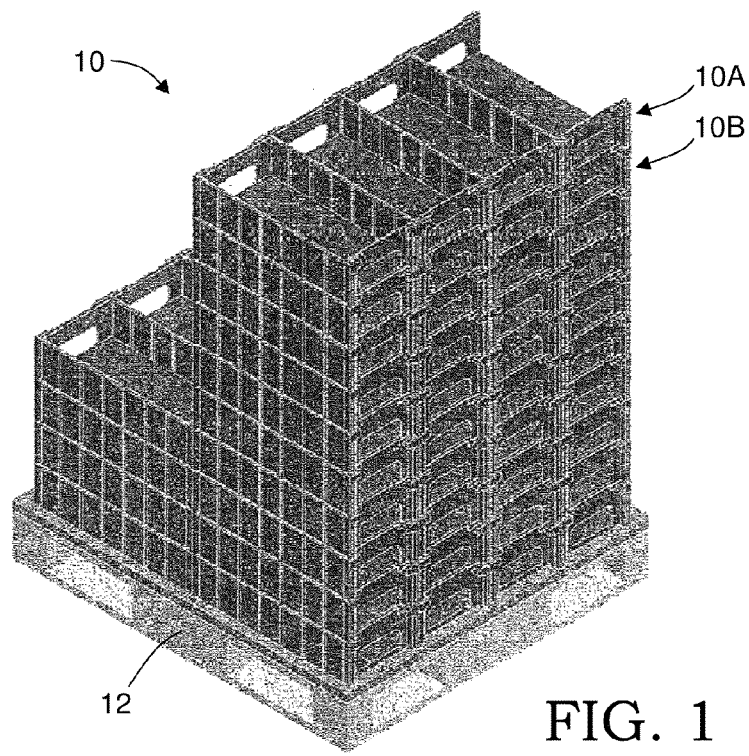
FIG. 1 is a perspective view of a plurality of stackable trays, in accordance with this invention.

Referring now to the drawings, there is illustrated in FIG. 1 a plurality of stackable trays, indicated generally at 10, in accordance with this invention. The stackable trays 10 can be used to store and transport large quantities of envelopes (not shown) or other types of stationary products. For example, the stackable trays 10 may each be filled with a stack of envelopes. The stackable trays 10 can be stacked on a skid 12 to form a plurality of vertical columns of trays. The skid 12 can then be transported to another location for storage or further processing of the envelopes. Although the stackable trays 10 will be described in the context of storing and transporting envelopes, it should be appreciated that the stackable trays 10 can be used in any desired environment and for any desired purpose.

As shown in FIG. 1, there is illustrated a first embodiment of a pair of stackable trays including a first stackable tray, indicated generally at 10A, which is stacked on top of a second stackable tray, indicated generally at 10B. The illustrated first and second stackable trays 10A, 10B are similar to one another, although such is not required. Thus, only the first stackable tray 10A will be described in further detail. Similar features of the second stackable tray 10B have been identified with common reference numerals having the suffix letter B (i.e., 20B, 30B, 40B, etc.).

Referring now to FIGS. 2 through 8, the illustrated first stackable tray 10A includes a bottom 20A, a rear wall 30A, and a pair of side walls 40A that define a rectangular, open tray structure. The first stackable tray 10A may, however, define any shape or have any dimensions. The first stackable tray 10A can be formed from a rigid material, including but not limited to a plastic or metal material. Further, the first stackable tray 10A can be integrally formed by a molding process, such as an injection molding process or the like. Alternatively, the first stackable tray 10A may be assembled from individual components.

The illustrated first stackable tray 10A includes a pair of vertical support columns 42A provided along an outer surface of each side wall 40A. As shown, the support columns 42A vertically extend along each corner of the first stackable tray 10A. The first stackable tray 10A may, however, include any desired number or configuration of support columns 42A. As will be explained below, the support columns 42A are configured to provide separation between the side walls 40A of trays that are placed adjacent to one another on the skid 12. The support columns 42A also facilitate vertical alignment of the stackable trays 10A, 10B. The support columns 42A also prevent relative movement between the stackable trays 10A, 10B once they are stacked in vertical columns, as shown in FIG. 1. The support columns 42A are preferably similar in structure to one another and, therefore, only one support column 42A will be further described below.

The illustrated support column 42A includes a top surface that is located near a top a portion thereof, although such is not required. The top surface of the support column 42A can be positioned below an upper edge 41A of the side wall 40A. A protrusion 44A is provided on the top surface of the support column 40A and extends upwardly there from. The illustrated protrusion 44A is an elongated member that laterally extends in a perpendicular manner from the side wall 40A. The protrusion 44A defines an upper edge that includes angled surfaces, which intersect one another to form an apex (see FIG. 8) or the like in order to facilitate alignment of the stackable trays 10A, 10B, as will be explained below. The protrusion 44A may, however, have any desired shape or configuration.

The illustrated support column 42A also includes a first groove 45A that is formed in a bottom portion thereof. The illustrated first groove 45A extends in a first direction that is perpendicular to the side wall 40A of the first stackable tray 10A, although such is not required. The first groove 45A is aligned with the protrusion 44A in the vertical direction, the purpose of which will be explained below. In the illustrated embodiment, the first groove 45A is formed by a pair of spaced apart rib members that laterally extend from the outer surface of the side wall 40A. However, the first groove 45A can be any recess formed in a bottom surface of the support column 42A that extends perpendicular to the side wall 40A. The first groove 45A may have any desired cross-sectional shape such as, for example, a U-shape or V-shape configuration to facilitate vertical alignment of the stackable trays 10A, 10B.

The illustrated support column 42A also includes a second groove 46A that is formed in the bottom surface thereof. The illustrated second groove 46A extends in a second direction that is parallel with the side wall 40A (e.g. perpendicular to the first groove 45A), although such is not required. The second groove 46A is aligned with the upper edge 41A of the side wall 40A in the vertical direction, the purpose of which will be explained below. In the illustrated embodiment, the second groove 46A is defined by notches that are formed in the bottom edges of the vertical rib members of the support column 42A. The illustrated second grooves 46A are aligned with one another along the side wall 40A. The second groove 46A may have any desired cross-sectional shape such as, for example, a U-shape or V-shape configuration to facilitate alignment of the stackable trays 10A, 10B.

The support column 42A also includes an engagement feature 48A, although such is not required. The engagement feature 48A facilitates handling of the first stackable tray 10A by an automated stacking and retrieval system. The illustrated engagement feature 48A includes a vertical wall that laterally extends from the outer surface of the side wall 40A of the first stackable tray 10A. The vertical wall is spaced from the inner rib member of the support column 42A to form a void there between that is capable of receiving a piece of tooling (not shown) provided on a delivery mechanism in the automated stacking and retrieval system (described below). The vertical wall may include a curved lower edge or other structural feature that corresponds with the tooling. It should be appreciated that the engagement feature 48A can be configured in any manner to facilitate handling of the first stackable tray 10A. For example, the engagement feature 48A may alternatively be an outwardly extending knob, a clip, a thru-hole, a latch, or any other structural feature for handling the first stackable tray 10A.

The illustrated support column 42A defines an outer surface that is laterally spaced from the outer surface of the side wall 40A. Thus, when two stackable trays 10A, 10B are positioned adjacent to one another on the skid 12, the side walls 40A, 40B of the adjacent trays are spaced apart from one another by the support columns 42A, 42B. This enables a person to reach between the respective side walls 40A with relative ease and grab the desired stackable tray 10A using apertures or handles that are formed in the side walls 40A.

Figure 2:
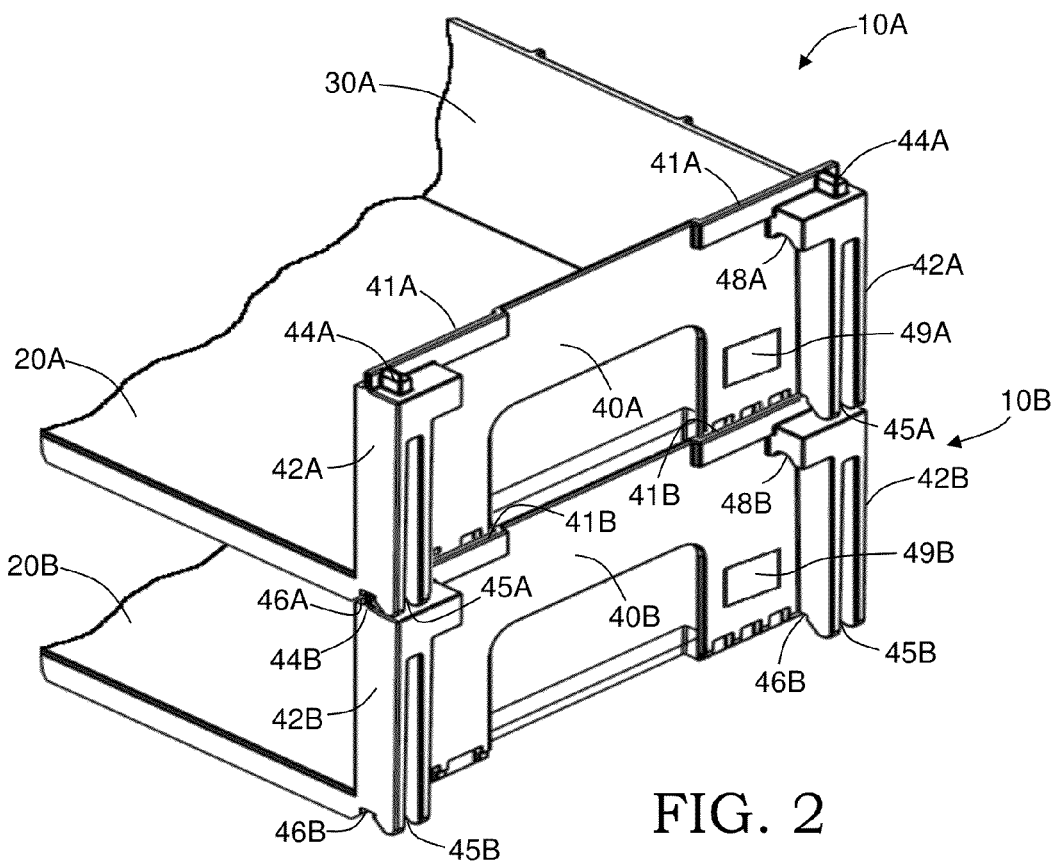
FIG. 2 is a perspective view of portions of a first embodiment of two stackable trays shown in FIG. 1.
Figure 3:
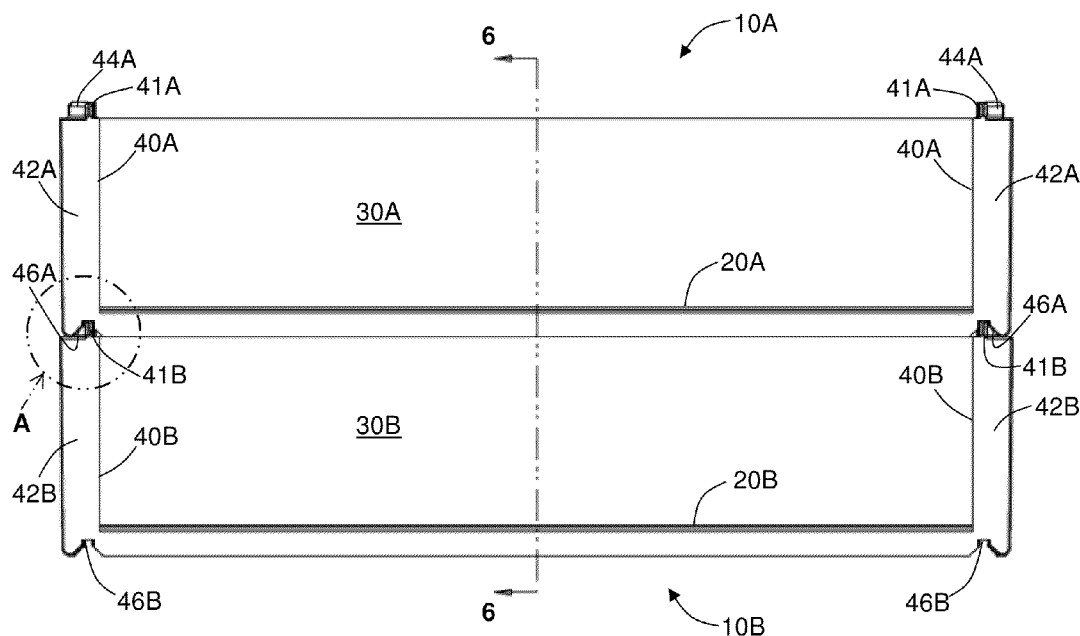
FIG. 3 is a front elevational view of the stackable trays shown in FIG. 2.
Figure 4:
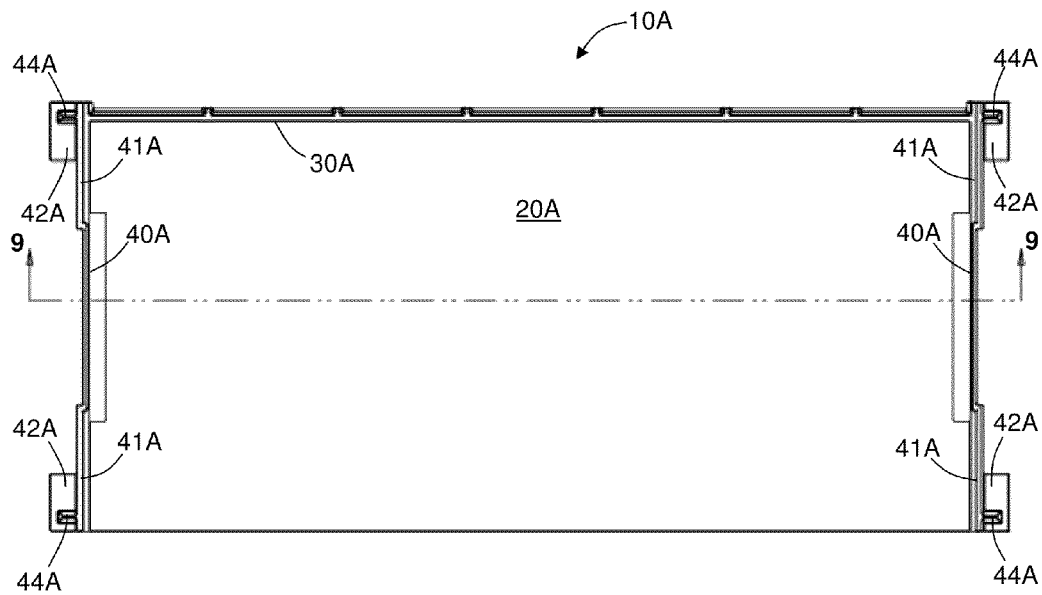
FIG. 4 is a top plan view of the stackable trays shown in FIG. 2.
Figure 5:
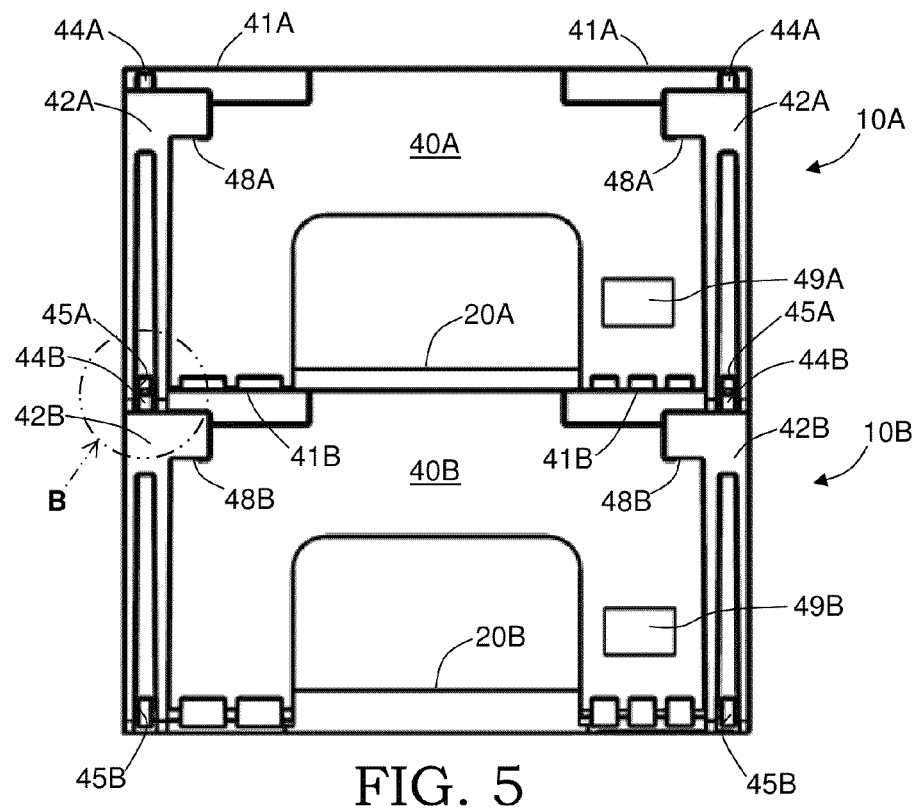
FIG. 5 is a side elevational view of the stackable trays shown in FIG. 2.
Figure 6:
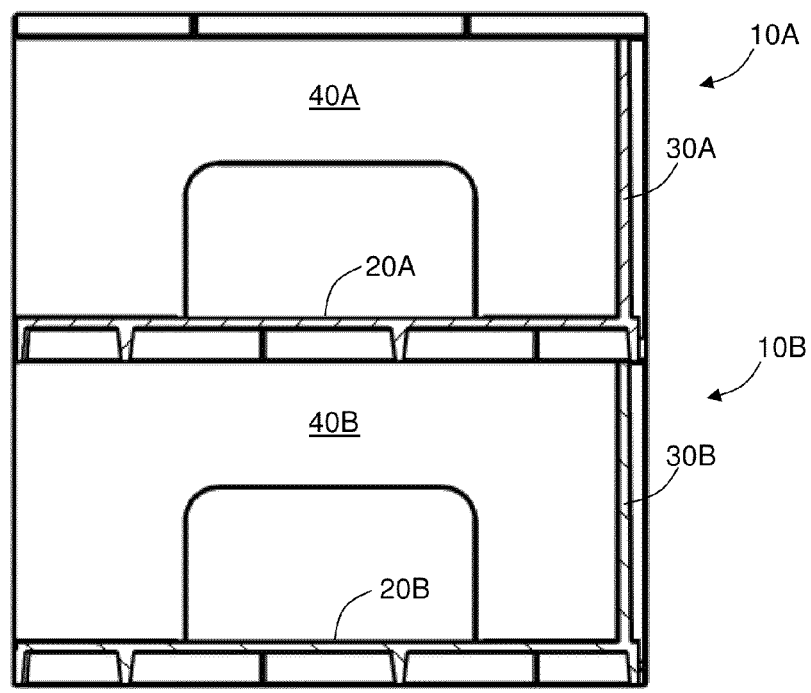
FIG. 6 is a cross sectional side view taken along section line 6-6 of the stackable trays shown in FIG. 3.

As shown in FIGS. 2 and 5, the first stackable tray 10A also includes an identification element 49A, although such is not required. The identification element 49A may be provided on any portion of the first stackable tray 10A such as, for example, on one or both of the side walls 40A. The identification element 49A can be any component that is capable of identifying the first stackable tray 10A, its location, or its contents. In one example, the identification element 49A is a visual label and may include a barcode or other scannable image. In another example, the identification element 49A is a device that transmits a signal which can be detected by a receiver. In this example, the identification element 49A may be detectable by a positioning system, such as global positioning system or the like. Alternatively (or in addition), the identification element 49A may be a rewritable memory device that is capable of storing information relating to the first stackable tray 10A, its location, or its contents. The stackable tray 10A may also be a specified color that designates the size of envelopes or other objects provided therein. As will be described below, the specified color can be identified by a color recognition device that is incorporated in an automated stacking and retrieval system. Thus, it should be appreciated that the identification element 49A can be any label, device, color, or other component that is capable of providing desired information about the first stackable tray 10A, its location, or its contents.

Figure 7:
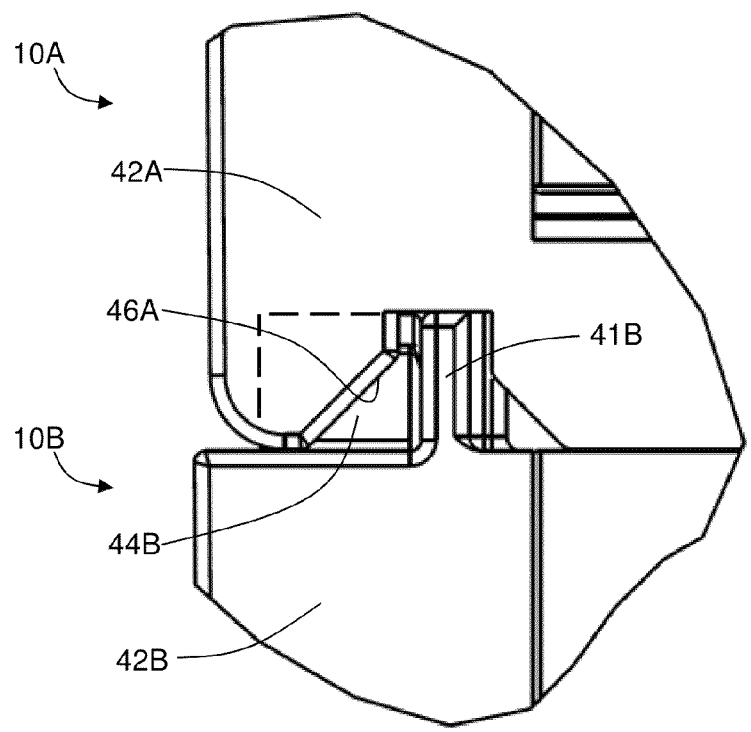
FIG. 7 is an enlarged front view of a portion of the stackable trays shown in FIG. 3 that is indicated by the dashed reference circle A.

The first and second stackable trays 10A, 10B will now be described in the stacked position. As best shown in FIG. 7, the upper edge 41B of the side wall 40B on the second stackable tray 10B is received within the second groove 46A of the first stackable tray 10A. This is a result of the second grooves 46A, 46B being aligned with the upper edges 41A, 41B of the side walls 40A, 40B in the vertical direction on each of the trays 10A, 10B. When in the stacked position, the upper edge 41B of the side wall 40B and the second groove 46A cooperate to prevent the first and second stackable trays 10A, 10B from moving side-to-side relative to one another. The illustrated second groove 46A has an inverted V-shaped cross-section to facilitate vertical alignment of the stackable trays 10A, 10B. A relatively tight fitting connection is created between the upper edge 41B of the side wall 40B and the second groove 46A to eliminate or reduce movement between the stackable trays 10A, 10B.

Figure 8:
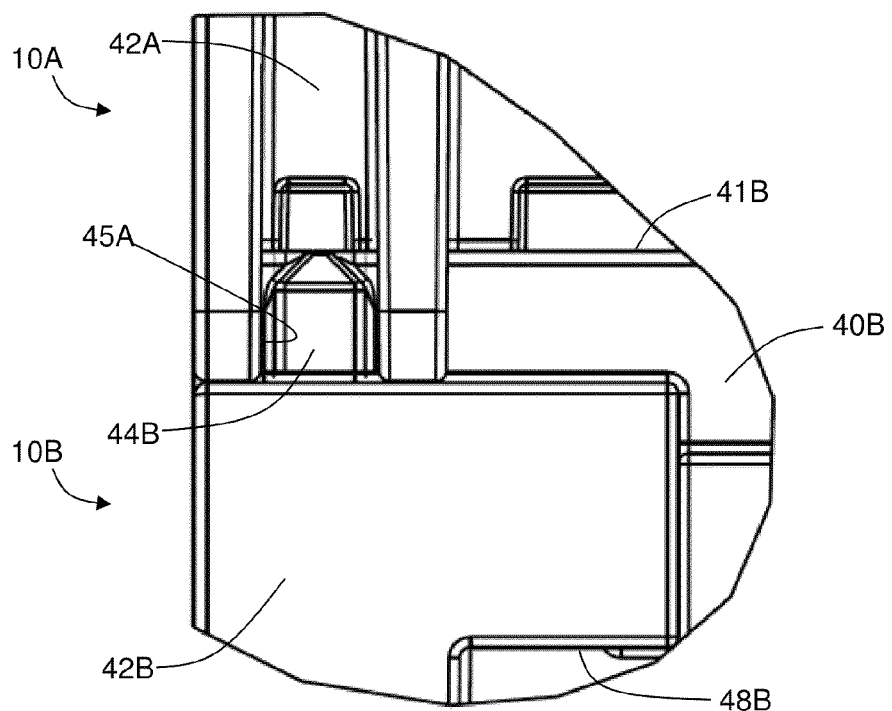
FIG. 8 is an enlarged side view of a portion of the stackable trays shown in FIG. 5 that is indicated by the dashed reference circle B.
Figure 9:
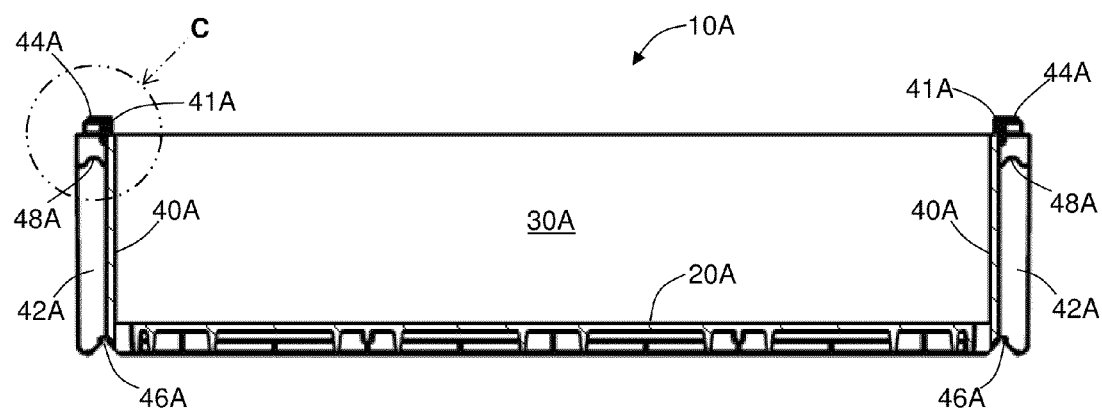
FIG. 9 is cross sectional front view taken along section line 9-9 of one of the stackable trays shown in FIG. 4.
Figure 10:
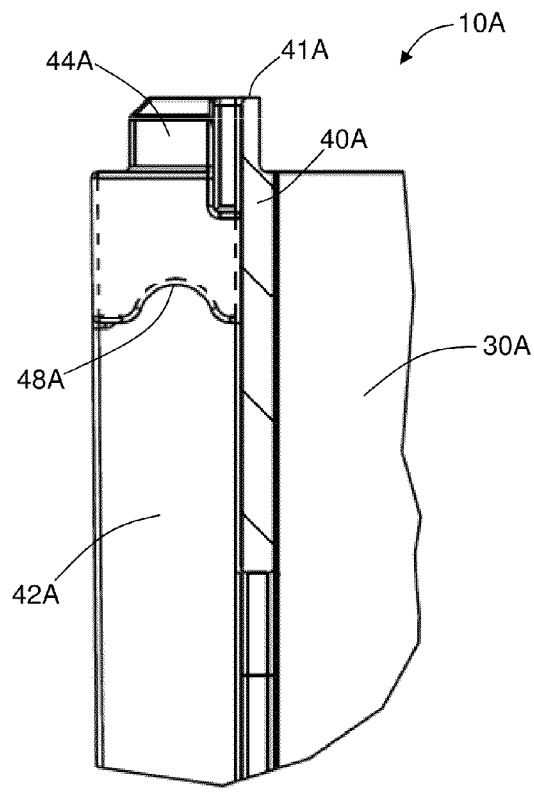
FIG. 10 is an enlarged front view of a portion of the stackable tray shown in FIG. 9 that is indicated by the dashed reference circle C.

As best shown in FIG. 8, the protrusion 44B of the second stackable tray 10B is received within the first groove 45A of the corresponding support column 42A of the first stackable tray 10A. This is a result of the first grooves 45A, 45B being aligned with the protrusions 44A, 44B in the vertical direction on each of the trays 10A, 10B. When in the stacked position, the protrusion 44B and the first groove 45A cooperate to prevent the first and second trays 10A, 10B from moving in a forward or rearward direction relative to one another. As described above, the protrusion 44B forms an apex to facilitate vertical alignment of the stackable trays 10A, 10B. A relatively tight fitting connection is created between the protrusion 44B and the first groove 45A to eliminate or reduce movement between the stackable trays 10A, 10B.

Figure 11:
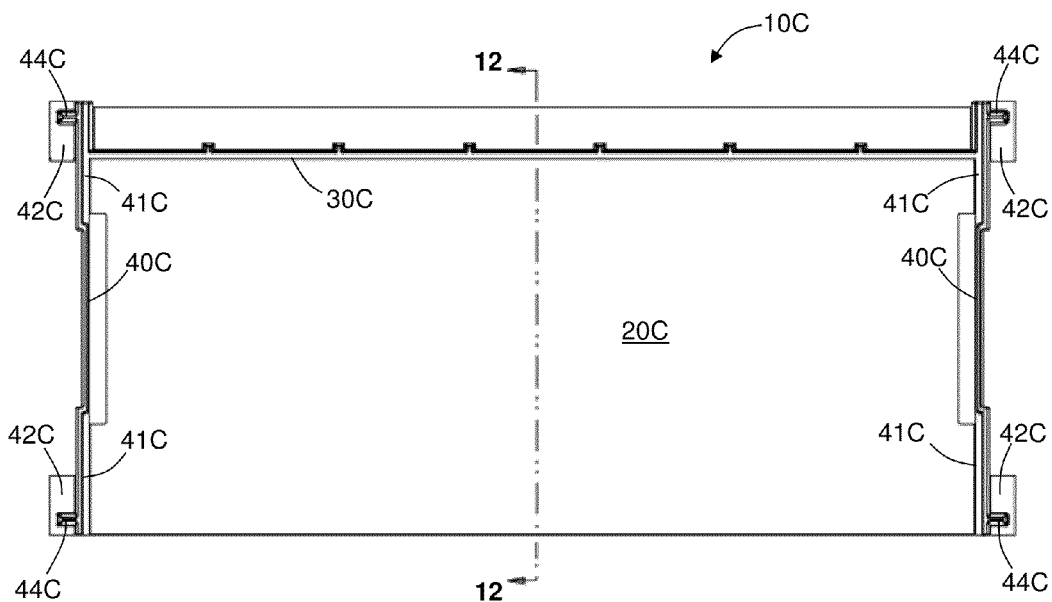
FIG. 11 is a top plan view of a second embodiment of a stackable tray, in accordance with this invention.
Figure 12:
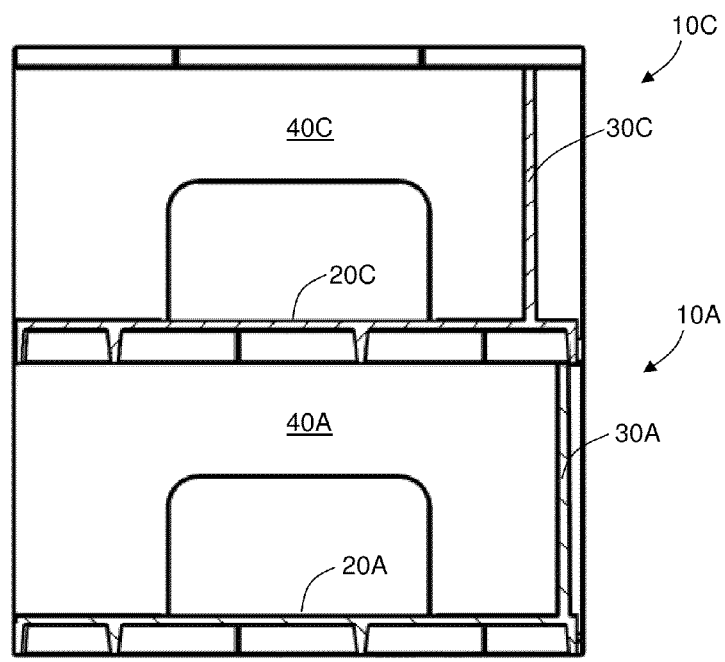
FIG. 12 is a cross sectional side view taken along section line 12-12 of the stackable tray shown in FIG. 11 stacked on top of one of the stackable trays shown in FIG. 3.

Referring now to FIGS. 11 and 12, there is illustrated a second embodiment of a stackable tray including a third stackable tray, indicated generally at 10C, in accordance with this invention. The third stackable tray 10C may include any structural features as described and illustrated with reference to the first and second stackable trays 10A, 10B above, although such is not required. Similar features of the third stackable tray 10C have been identified with common reference numerals having the suffix letter C (i.e., 20C, 30C, 40C, etc.). It should be appreciated that similar features are structured similarly, operate similarly, and/or have the same function unless otherwise indicated by the drawings or this specification.

For example, the illustrated third stackable tray 10C includes a bottom 20C, a rear wall 30C, and a pair of side walls 40C. However, the illustrated rear wall 30C is inwardly spaced from a rear edge of the bottom 20C. This enables the third stackable tray 10C to store envelopes having a smaller size as compared to the first stackable tray 10A in the above embodiment. Nonetheless, the third stackable tray 10C retains the same overall outer dimensions as the first stackable tray 10A and, therefore, is stackable therewith as shown in FIG. 12. Thus, it should be appreciated that the stackable trays 10A, 10C may be individually configured to store envelopes having any desired size, wherein the various trays can be stacked and subsequently retrieved with relative ease.

Figure 13:
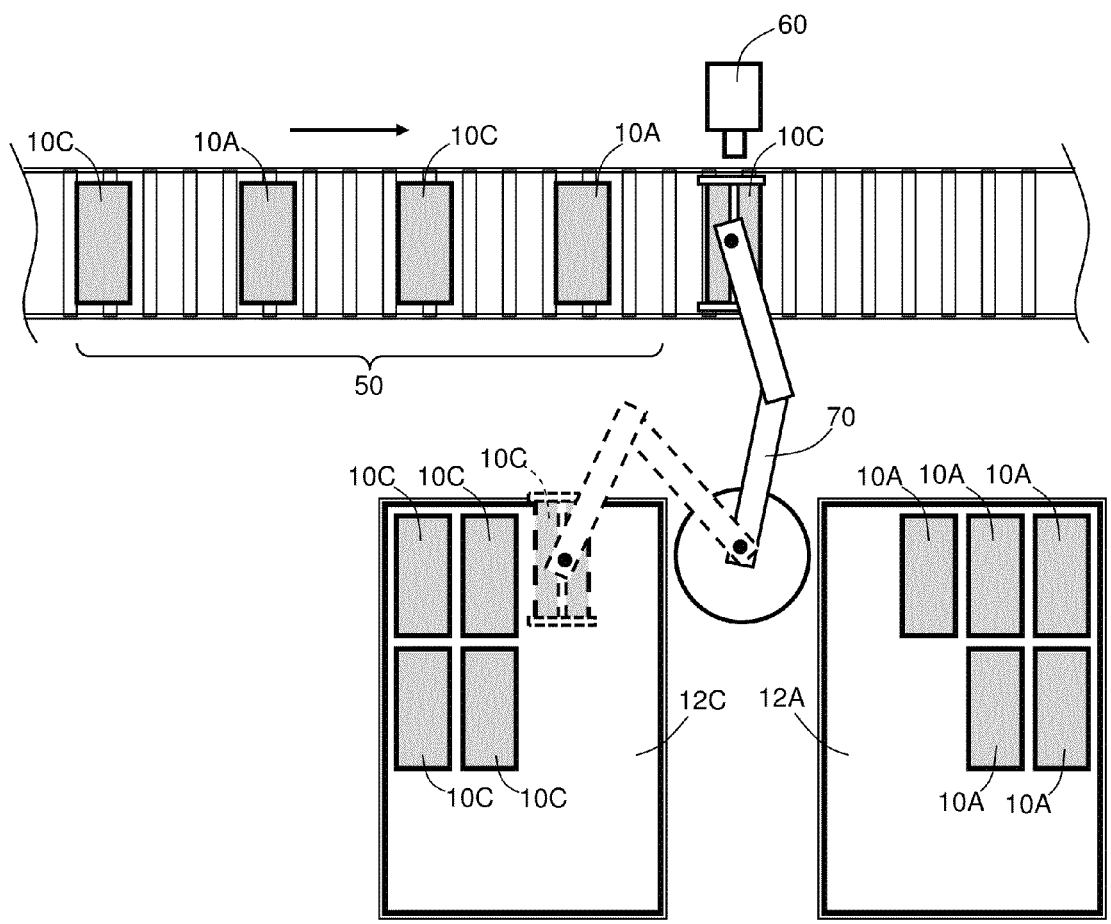
FIG. 13 is a top plan view of an automated system for stacking and retrieving the stackable trays in accordance with this invention.

Referring now to FIG. 13, there is illustrated an automated system for stacking and retrieving the various stackable trays 10A, 10C that are shown in FIG. 12. The automated system is configured to perform a stacking operation, wherein the stackable trays 10A, 10C can be collectively stacked together on a single skid (not shown) or sorted and stacked on separate skids 12A, 12C. The automated system is also configured to perform a retrieval operation, wherein the stackable trays 10A, 10C can be retrieved from each of the skids 12A, 12C in a desired order. The automated system will now be described in further detail.

The illustrated automated system includes a conveyor system, indicated generally at 50. The illustrated conveyor system 50 is a roller conveyor having a plurality of rollers that form a conveyor path. The stackable trays 10A, 10C can be placed on the conveyor system 50 in any manner and moved along the conveyor path from one location to another. For example, the stackable trays 10A, 10C can be moved along the conveyor path by a chain or belt driven mechanism (not shown). The illustrated stackable trays 10A, 10C are suitable for a roller conveyor because the trays have a generally flat bottom portion. In other words, the stackable trays 10A, 10C do not have portions that extend below a bottom surface thereof, which would otherwise obstruct movement of the trays across the roller conveyor. In other embodiments, however, the conveyor system 50 can be a belt conveyor or any other material handling system.

The automated system also includes a tray identifier 60. The tray identifier 60 can be any device that is capable of identifying the stackable trays 10A, 10C as they move along the conveyor system 50. The illustrated tray identifier 60 is capable of reading the identification elements 49A, 49C (not shown) that are provided on the stackable trays 10A, 10C. For example, the tray identifier 60 can be a barcode scanner, a receiver that is configured to receive a signal generated by the identification elements 49A, 49C, or a color recognition device that is capable of determining a color of the respective stackable trays 10A, 10C.

The illustrated automated system also includes a delivery mechanism 70. The delivery mechanism 70 can be a robotic arm, as illustrated in FIG. 13, or an overhead hoist mechanism (not shown). In any event, the delivery mechanism 70 is configured to grab the individual stackable trays 10A, 10C using the engagement features 48A, 48C (not shown) and move them between the conveyor system 50 and one or more skids 12A, 12C, as will be further explained below. The delivery mechanism 70 can be any automated mechanism that is configured to accomplish the functions described herein.

The stacking and retrieval operations of the automated system will now be described. During the stacking operation, the stackable trays 10A, 10C are moved along the conveyor system 50 as indicated by the direction arrow in FIG. 13. It should be appreciated that the stackable trays 10A, 10C can be empty or filled with envelopes during this operation. As shown, the tray identifier 60 identifies the individual trays, such as the third stackable tray 10C for example. After the third stackable tray 10C has been identified, the delivery mechanism 70 grabs the third stackable tray 10C and removes it from the conveyor system 50. The delivery mechanism 70 then stacks the third stackable tray 10C on the desired skid 12C. It should be appreciated that the stackable trays 10A, 10C can be randomly stacked together on the same skid (not shown) or can be sorted and separately stacked on their respective skids 12A, 12C as shown in FIG. 13. When a skid 12A, 12C is full of stacked trays, it can be removed and an empty skid (not shown) can be located in its place. Thus, the stacking operation can be continuously performed for any length of time without interruption.

During the retrieval operation, the stackable trays 10A, 10C are provided on the respective skids 12A, 12C, either pre-sorted or in random order. It should be appreciated that the stackable trays 10A, 10C can be empty or filled with envelopes during this operation. As shown, the delivery mechanism 70 grabs a desired tray, such as the third stackable tray 10C for example. The delivery mechanism 70 removes the third stackable tray 10C from the skid 12C and delivers it to the conveyor system 50. The automated system may optionally include a second tray identifier (not shown) to ensure that the desired tray has been retrieved from the skids 12A, 12C and delivered to the conveyor system 50. When a skid 12A, 12C is emptied, it can be removed and a full skid (not shown) can be located in its place. Thus, the retrieval operation can be continuously performed for any length of time without interruption.

It should be appreciated that the stacking operation and the retrieval operation can be performed consecutively by the same automated system, thereby creating an infinite processing loop. Further, the automated system described herein can be incorporated in a production facility where empty trays are filled with envelopes and stacked on the skids or in a processing facility where full trays are removed from the skids and emptied for further processing.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A stackable tray comprising:
 a tray having a bottom, a pair of side walls each having an upper edge, and a rear wall; and
 a pair of support columns provided on each side wall, each support column including:
 a protrusion extending upwardly from a top portion of the support column;
 a first groove formed in a bottom portion of the support column, the first groove being aligned with the protrusion in the vertical direction; and
 a second groove formed in the bottom portion of the support column, the second groove being aligned with the upper edge of the respective side wall in the vertical direction.

2. The stackable tray of claim 1, wherein the protrusion is an elongated member that perpendicularly extends from an outer surface of the side wall.

3. The stackable tray of claim 2, wherein an upper edge of the protrusion includes angled surfaces that intersect with one another to form an apex.

4. The stackable tray of claim 1, wherein the first groove is defined by a pair of spaced apart vertical rib members that laterally extend from an outer surface of the side wall.

5. The stackable tray of claim 4, wherein the second groove is defined by aligned notches that extend upwardly into bottom edges of the vertical rib members.

6. The stackable tray of claim 1, wherein the second groove has an inverted V-shaped configuration.

7. The stackable tray of claim 1, wherein each support column defines an outer surface that is laterally spaced from an outer surface of the side wall.

8. The stackable tray of claim 1, wherein each support column further includes an engagement feature adapted to receive tooling provided on an automated delivery system.

9. The stackable tray of claim 1, further including an identification element that identifies the tray or contents provided therein.

10. The stackable tray of claim 1, wherein the rear wall is spaced inwardly from a rear edge of the bottom of the tray, wherein the stackable tray retains the same overall outer dimensions.

11. The stackable tray of claim 1, wherein the second groove is wider than the upper edge of the side wall.

* * * * *